UNITED STATES PATENT OFFICE 1,938,053

HYDROXY-THIONAPHTHENE COMPOUND

Norbert Steiger, Frankfort-on-the-Main, and Walter Brunner, Frankfort-on-the-Main-Fechenheim, Germany, assignors to General Aniline Works, Inc., New York, N. Y., a corporation of Delaware No Drawing. Application January 6, 1933, Serial No. 650,578, and in Germany January 11, 1932

5 Claims. (Cl. 260—53)

The present invention relates to hydroxy-thionaphthene compounds, more particularly to those corresponding to the general formula

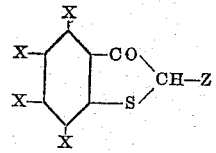

(wherein two X's mean methyl, the third X an alkoxy-group and the fourth X hydrogen or halogen and Z means H or COOH).

The process of making these compounds comprises converting dimethyl-alkoxy-benzenes which contain an amino-group or a sulfonic acid group and a free ortho position thereto or both groups in orthoposition to one another and which may contain halogen, according to a series of reactions already known per se, into dimethyl-alkoxy-benzene thioglycolic acids which contain the ortho position relative to the thioglycolic acid group free or substituted by $NH_2$, CN, $CONH_2$ or COOH and which may contain halogen, and subjecting the latter, possibly after elimination or transformation of the ortho-standing groups, to a ring-closing reaction.

The steps of reaction used for preparing the new compounds are per se already known. The series of reactions may be illustrated by the following scheme of formulæ:

In these formulæ two X's mean methyl, the third X an alkoxy-group and the fourth X hydrogen or halogen.

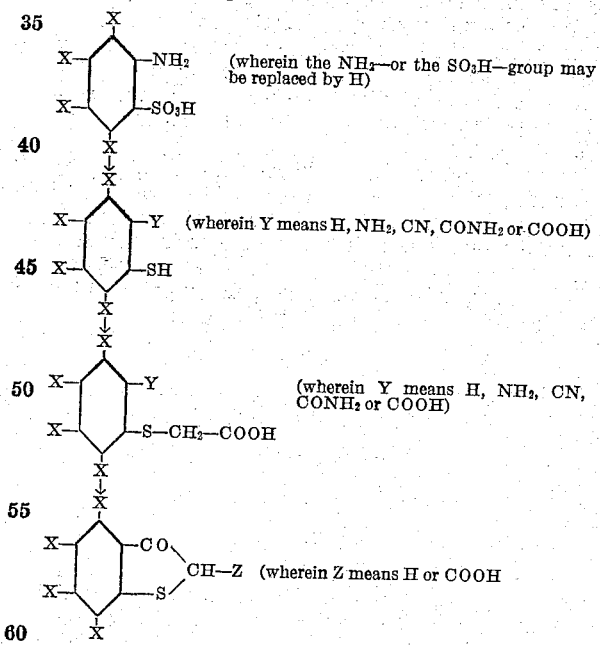

For producing halogen-containing hydroxy-thionaphthenes one may also start from unhalogenated materials and subject the hydroxy-thionaphthenes thus formed to an acylation, halogenation and saponification.

The new compounds being object of this invention are valuable intermediates for the production of indigoid dyestuffs.

In order to further illustrate our invention the following examples are given, the parts being by weight and all temperatures in centigrade degrees; but it is, however, to be understood that our invention is not limited to the particular products nor reacting conditions mentioned therein.

Example 1

260 parts of 2.3-dimethyl-4-amino-benzene-1-sulfonic acid (1.2.3-xylidine-6-sulfonic acid) are dissolved in 900 parts of water and 180 parts of caustic soda solution of 33° Bé. Then 84 parts of sodium nitrite are added and this solution is introduced at usual temperature into 440 parts of sulfuric acid deca-normal and 1500 parts of water. The whole is warmed on the water-bath until the diazo-reaction has disappeared and steamed until the formation of crystal-crusts; then 1800 parts of salt-water of 24° Bé. are added. After a short standing the mono-sodium salt of the 2.3-dimethyl-4-hydroxy-benzene-1-sulfonic acid entirely precipitates. It is filtered by a strong suction and alkylated as follows:

The sodium salt of this xylenol-sulfonic acid is dissolved in 500 parts of water, 275 parts of caustic soda solution of 40° Bé. are added and at 25-30° 132 parts of dimethyl-sulfate are allowed to drop in during one hour. After one hour's stirring again further 132 parts of dimenthyl-sulfate are added and then the whole is warmed during one hour to 50°; then it is evaporated on the water-bath until the beginning of the crystallization. After cooling a stiff pulp of crystals of the sodium salt of the 2.3-dimethyl-4-methoxy-benzene-1-sulfonic acid is obtained, which is filtered with strong suction and dried.

120 parts of the dry sodium salt thus obtained are melted with 150 parts of phosphorus pentachloride at 110° for two hours. The mass is decomposed by the addition of ice and the solid sulfo-chloride is filtered with suction and then reduced by dissolving it in 300 parts of chlorobenzene with 200 parts of zinc and 760 parts of sulfuric acid deca-normal at 100° during 8 hours. When the reduction is finished, to the chlorobenzene solution of the mercaptan 132 parts of caustic soda solution deca-normal and then an alkaline solution of 50 parts of mono-chloro-acetic acid are added. The chloro-benzene is blown off by means of steam and the remaining aqueous solution is acidified. The 2.3-dimethyl- 4-methoxy-phenyl-1-thioglycolic acid separates in the form of crystals.

In the same manner from 1.2.4-xylidine-5-sulfonic acid and 3.4-dimethyl-6-methoxy-phenyl-1-thioglycolic acid, from the 1.4.2-xylidine-5-sulfonic acid the 2.5-dimethyl-4-methoxy-phenyl-1-thioglycolic acid, from the 1.4.2-xylidine-6-sulfonic acid the 2.5-dimethyl-3-methoxy-phenyl-1-thioglycolic acid may be obtained.

30 parts of the 2.3-dimethyl-4-methoxy-phenyl-1-thioglycolic acid are heated to boiling for two hours with 40 parts of phosphorus trichloride. Then the reaction product is separated from the inorganic salts and the phosphorus trichloride is distilled off in vacuo. The remaining chloride of the thioglycolic acid is diluted with 50 parts of carbon disulfide and stirred at 15–30° with 36 parts of aluminium chloride. The carbon disulfide is distilled off and the residue is poured on ice-water. The nearly colorless 6.7-dimethyl-5-methoxy-3-hydroxy-thionaphthene melts at 150° and corresponds to the following formula:

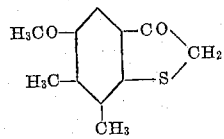

In an analagous manner 3.5-dimethyl-2-amino-benzene-1-sulfonic acid may be converted into 4.6-dimethyl-7-ethoxy-3-hydroxy-thionaphthene.

Example 2

3.5-dimethyl-4-amino-benzene-1-sulfonic acid is transformed into the 3.5-dimethyl-4-methoxy-phenyl-1-thioglycolic acid according to example 1. 25 parts of this thioglycolic acid are added at —12° to 450 parts of chloro-sulfonic acid and the whole is stirred at this temperature for about 4 hours. Then the mass is poured on ice, the 4.6-dimethyl-5-methoxy-hydroxy-thionaphthene thus obtained is filtered off with suction, washed with water until neutral reaction and dried carefully. It corresponds to the following formula:

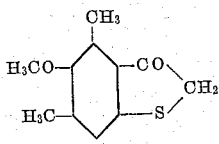

Example 3

By treating the 1.4-dimethyl-2-amino-5-ethoxy-benzene with chloride of sulfur according to U. S. Patent No. 1,637,023, saponifying the thiazthionium-chloride thus obtained, condensation of the amino-mercaptan with mono-chloro-acetic acid and treating the diazotised 1.4-dimethyl-2-amino-5-ethoxy-benzene-3-thioglycolic acid with cuprous cyanide according to Sandmeyer, the 1.4-dimethyl-2-cyano-5-ethoxy-benzene-3-thioglycolic acid is obtained. This 1.4-dimethyl-2-cyano-5-ethoxy-benzene-3-thioglycolic acid is heated with caustic soda solution, e. g. according to the process of German Patent No. 190,674, and the obtained precipitate of the amino-thionaphthene-carboxylic acid is acidified by means of sulfuric acid and warmed for some time. In this manner the 4.7-dimethyl-6-ethoxy-hydroxy-thionaphthene which melts at 94–96° is obtained. It corresponds to the following formula:

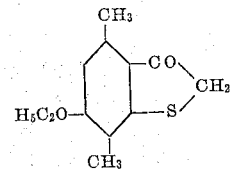

Example 4

1.2-dimethyl-3-methoxy-6-amino-benzene-5-sulfonic acid is transformed according to Sandmeyer into the 1.2-dimethyl-3-methoxy-6-cyano-benzene-5-sulfonic acid. The acid-chloride obtained from this acid is reduced to the 1.2-dimethyl-3-methoxy-benzene-6-carboxylic acid-amide-5-mercaptan while a simultaneous saponification of the cyano-group, and condensed with mono-chloro-acetic acid according to the process of German Patent No. 516,994. In this manner the 1.2-dimethyl-3-methoxy-benzene-6-carboxylic acid-amide-5-thioglycolic acid is obtained, which is dissolved in water and soda and heated for some time with caustic soda solution decanormal. Thereby the 4.5-dimethyl-6-methoxy-3-hydroxy-thionaphthene-2-carboxylic acid precipitates in the form of the sodium salt, which may be easily transformed into the 4.5-dimethyl-6-methoxy-3-hydroxy-thionaphthene of 152–154° melting point by treatment with diluted acids. This hydroxy-thionaphthene corresponds to the following formula:

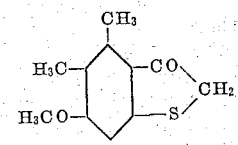

Example 5

1.3-dimethyl-4-hydroxy-5-nitro-benzene (Annalen, vol. 296, page 199) is methylated, reduced, acylated, chlorinated and saponified. The 1.3-dimethyl-2-chloro-4-methoxy-5-amino-benzene thus obtained is transformed into the 1.3-dimethyl-2-chloro-4-methoxy-benzene-5-mercaptan by diazotizing, converting into the corresponding xanthogenate and saponifying. By condensing the mercaptan with mono-chloro-acetic acid the 1.3-dimethyl-2-chloro-4-methoxy-benzene-5-thioglycolic acid of 74° melting point is obtained.

By ring-closure with chloro-sulfonic acid or by treating the corresponding acid-chloride with aluminium chloride this 1.3-dimethyl-2-chloro-4-methoxy-benzene-5-thioglycolic acid is converted into the 4.6-dimethyl-5-chloro-7-methoxy-3-hydroxy-thionaphthene of 118° melting point which corresponds to the following formula:

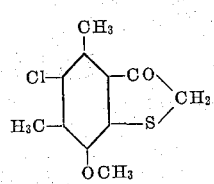

Example 6

1.4-dimethyl-2-chloro-benzene is nitrated, sulfonated and reduced. By decomposing while boiling the diazo-compound of the 1.4-dimethyl-2-chloro-3-amino-benzene-5-sulfonic acid thus obtained and subsequently methylating, the 1.4-dimethyl-2-chloro-3-methoxy-benzene-5-sulfonic acid is formed, which is converted into the chloride. This compound is reduced and the mercaptan thus obtained is condensed with mono-chloro-acetic acid.

The 1.4-dimethyl-2-chloro-3-methoxy-benzene-5-thioglycolic acid thus obtained melts at 94°; it is transformed by means of chloro-sulfonic acid into the 4.7-dimethyl-5-chloro-6-methoxy-3-hydroxy-thionaphthene of 128–130° melting point which corresponds to the following formula:

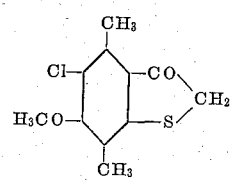

By replacing the 1.4-dimethyl-2-chloro-3-methoxy-benzene-4-thioglycolic acid by the corresponding ethoxy-compound, and working in an analogous manner, the 4.7-dimethyl-5-chloro-6-ethoxy-3-hydroxy-thionaphthene of 133–134° melting point is obtained.

Example 7

1.4-dimethyl-2-amino-6-methoxy-benzene (prepared e. g. according to Sonn, Berichte der deutschen Chem. Gesellschaft, vol. 49, pages 621, 2589) is treated according to U. S. Patent No. 1,637,023 with chloride of sulfur, the obtained thiazthionium-chloride is saponified, the amino-mercaptan is condensed with mono-chloro-acetic acid and the diazotized 1.4-dimethyl-5-chloro-6-methoxy-2-amino-benzene-3-thioglycolic acid (the anhydride of this acid melts at 187–189°) is treated according to Sandmeyer with cuprous cyanide.

The 1.4-dimethyl-5-chloro-6-methoxy-2-syano-benzene-3-thioglycolic acid is heated e. g. according to the process of German Patent No. 190,674 with caustic soda solution and the precipitate of the amino-thionaphthene-carboxylic acid thus obtained is acidified by means of sulfuric acid and warmed for some time. In this manner the 4.7-dimethyl-5-methoxy-6-chloro-3-hydroxy-thionaphthene of 129–130° melting point is obtained; it corresponds to the following formula:

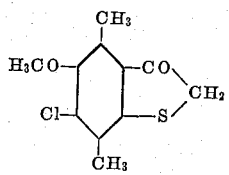

Example 8

1.4-dimethyl-2-methoxy-5-amino-benzene (Beilstein, vol. XIII, page 634) is acetylated and treated with bromine in a solution of glacial acetic acid. The 1.4-dimethyl-2-methoxy-3-bromo-5 acetyl-amino-benzene of 146–148° melting point thus formed is saponified and the base (melting point 96°) is transformed into the corresponding xanthogenate, saponified and converted into the 1.4-dimethyl-2-methoxy-3-bromo-benzene-5-thioglycolic acid of 78–80° melting point by condensation with mono-chloro-acetic acid. By treating the corresponding acid-chloride with aluminum-chloride the 4.7-dimethyl-5-methoxy-6-bromo-hydroxy-thionaphthene of 94° melting point is obtained which corresponds to the following formula:

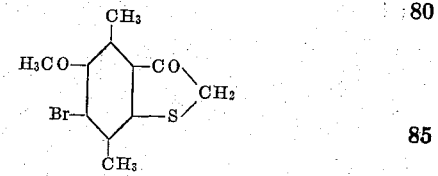

Example 9

1.2-dimethyl-3-methoxy-6-amino-benzene is acetylated, chlorinated and saponified. The 1.2-dimethyl-3-methoxy-4-chloro-6-amino-benzene thus obtained is converted according to Laukhardt's method into the corresponding xanthogene-compound which is saponified. The mercaptan thus obtained is condensed with mono-chloro-acetic acid and from the 1.2-dimethyl-3-methoxy-4-chloro-benzene-6-thioglycolic acid thus obtained the 4-chloro-5-methoxy-6.7-dimethyl-3-hydroxy-thionaphthene is produced by ring-closure by means of chloro-sulfonic acid. This hydroxy-thionaphthene possesses a pale yellow color and melts at 152°; it corresponds to the following formula:

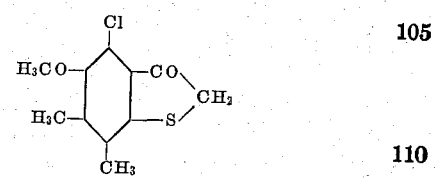

We claim:
1. The dimethyl-alkoxy-hydroxy-thionaphthenes corresponding to the general formula

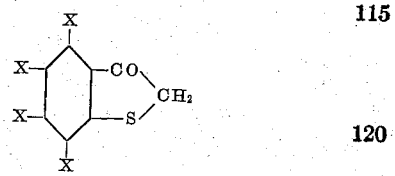

(wherein 2 X's mean methyl, the third X an alkoxy-group and the fourth X hydrogen or halogen), which compounds are nearly colorless powders of a definite melting point.

2. The dimethyl-alkoxy-hydroxy-thionaphthenes corresponding to the general formula

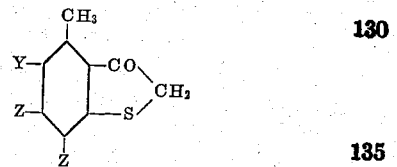

(wherein Y means hydrogen or chlorine, one Z a methyl, the other Z an alkoxy-group), which compounds are nearly colorless powders of a definite melting point.

3. The 4.7-dimethyl-6-ethoxy-3-hydroxy-thionaphthene of the formula

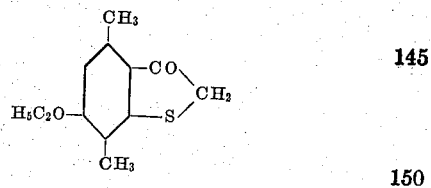

which compound represents a nearly colorless powder melting at 94–96°.
4. The 6.7-dimethyl-5-methoxy-3-hydroxy-thionaphthene of the formula
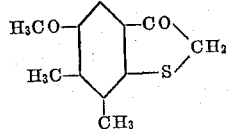
which compound represents a nearly colorless powder melting at 150°.
5. The 4.7-dimethyl-5-chloro-6-methoxy-3-hydroxy-thionaphthene of the formula
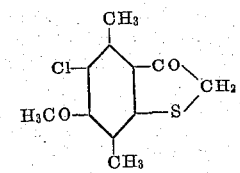
which compound represents a nearly colorless powder melting at 128–130°.
NORBERT STEIGER.
WALTER BRUNNER.